No. 646,169. Patented Mar. 27, 1900.
W. H. HARFIELD.
APPARATUS FOR ELECTRICALLY CONTROLLING ENGINES, ELECTROMOTORS, OR OTHER MACHINERY.
(Application filed Jan. 16, 1899.)
(No Model.) 5 Sheets—Sheet 1.
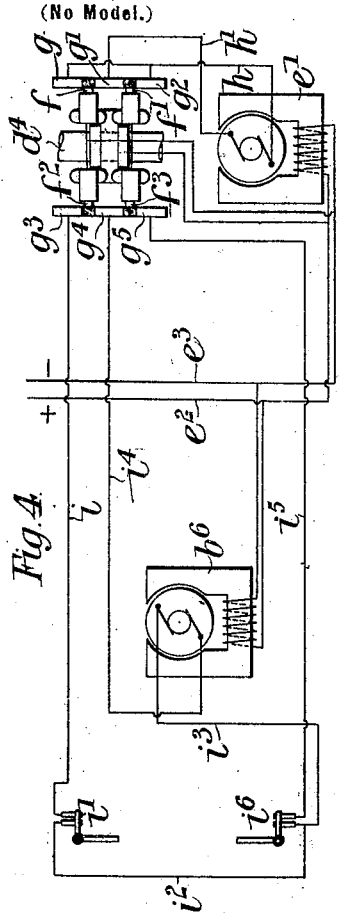
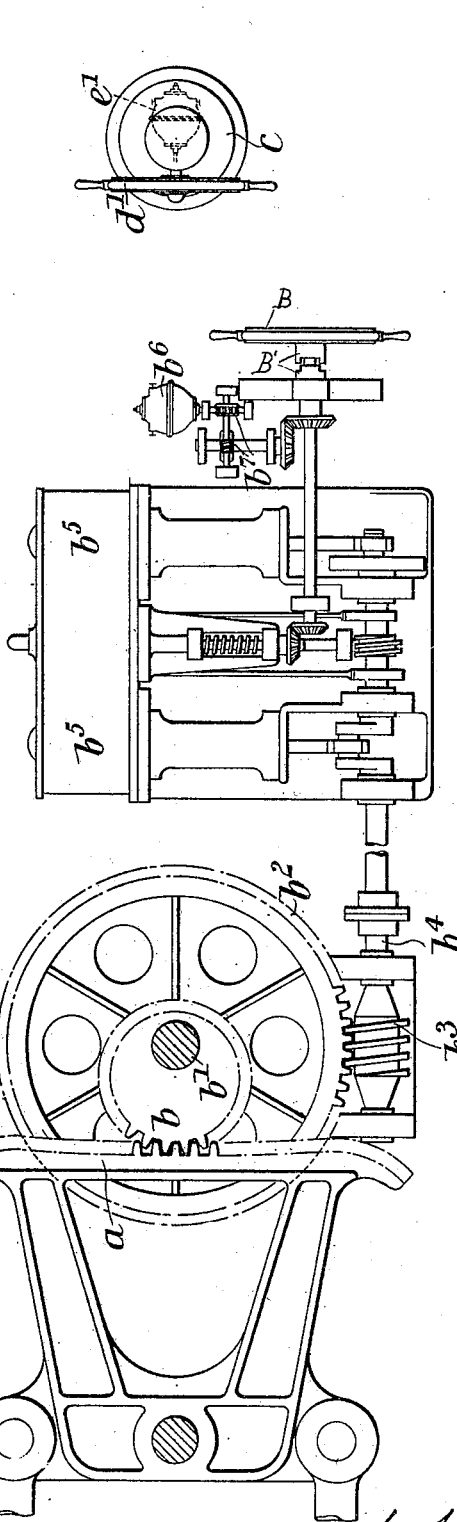
Witnesses. Inventor.

No. 646,169. Patented Mar. 27, 1900.
W. H. HARFIELD.
APPARATUS FOR ELECTRICALLY CONTROLLING ENGINES, ELECTROMOTORS, OR OTHER MACHINERY.
(Application filed Jan. 16, 1899.)
(No Model.) 5 Sheets—Sheet 3.
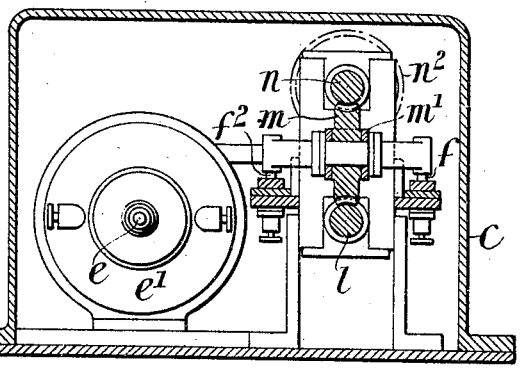
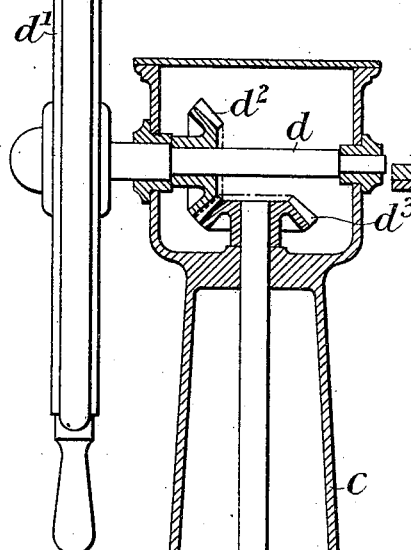
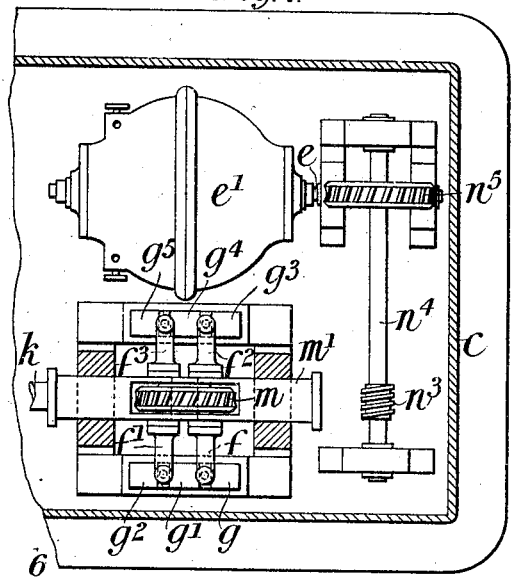
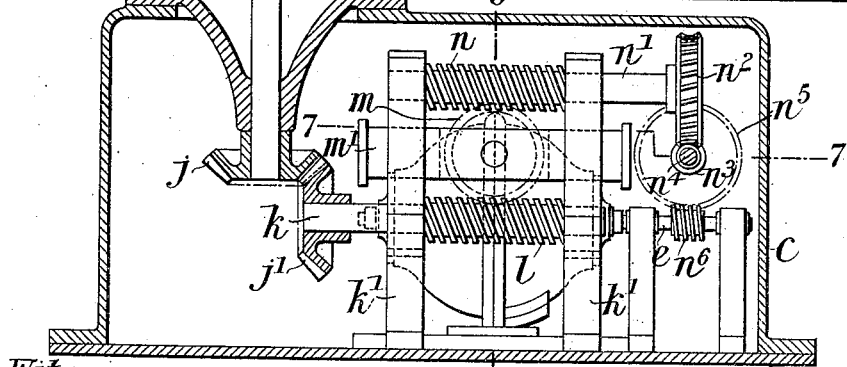
Witnesses. Inventor.

No. 646,169. Patented Mar. 27, 1900.
W. H. HARFIELD.
APPARATUS FOR ELECTRICALLY CONTROLLING ENGINES, ELECTROMOTORS, OR OTHER MACHINERY.
(Application filed Jan. 16, 1899.)
(No Model.) 5 Sheets—Sheet 4.

Witnesses. Inventor.

No. 646,169. Patented Mar. 27, 1900.
W. H. HARFIELD.
APPARATUS FOR ELECTRICALLY CONTROLLING ENGINES, ELECTROMOTORS, OR OTHER MACHINERY.
(Application filed Jan. 16, 1899.)
(No Model.) 5 Sheets—Sheet 5.

Witnesses. Inventor:

UNITED STATES PATENT OFFICE.

WILLIAM HORATIO HARFIELD, OF LONDON, ENGLAND.

APPARATUS FOR ELECTRICALLY CONTROLLING ENGINES, ELECTROMOTORS, OR OTHER MACHINERY.

SPECIFICATION forming part of Letters Patent No. 646,169, dated March 27, 1900.

Application filed January 16, 1899. Serial No. 702,327. (No model.)

*To all whom it may concern:*

Be it known that I, WILLIAM HORATIO HARFIELD, a subject of the Queen of Great Britain, residing at London, England, have invented new and useful Improvements in Apparatus for Electrically Controlling Engines, Electromotors, or other Machinery, (for which I have applied for a patent in Great Britain, No. 44, dated January 2, 1899,) of which the following is a specification.

The object of this invention is to automatically control the action of an electric current employed to actuate the valve of a steam-engine or to drive an electromotor or other prime motor, and is applicable to steering-gear, gun-training gear, ammunition and other hoists, and other machinery, particularly where an intermittent motion is required.

In carrying out my invention where a steam-engine is used I employ a small electromotor placed in any convenient position—say in the case of steering-gear at the pedestal or steering-station—to work my automatic gear and so arranged in connection with another electromotor actuating the valve of the engine that the ordinary motion of the steering-wheel by means of suitable switches and screw or other gear completes the circuit and causes both motors to revolve, whereby the motor at or near the engine opens the steam-valve. When the hand-wheel is stopped, the small motor at or near the pedestal or steering-station automatically breaks the circuit by means of the said switches and gear, causing the motor at the engine to stop, and the latter by means of its automatic valve-gear shuts off steam.

In the accompanying drawings I have for the purpose of illustration shown my invention as applied to ships' steering-gear.

Figure 2:
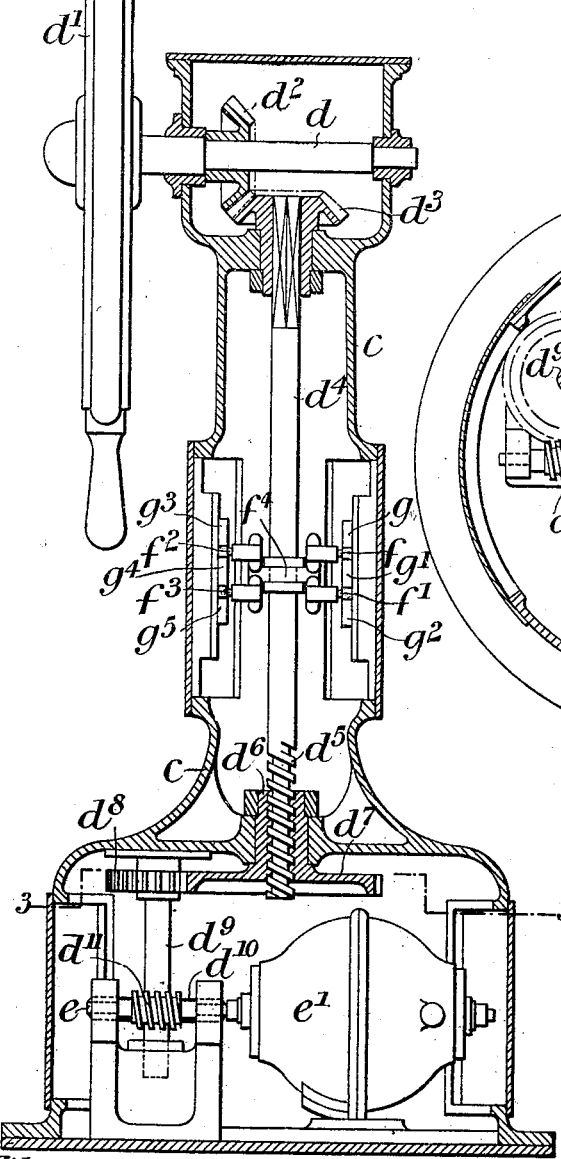
Figure 3:
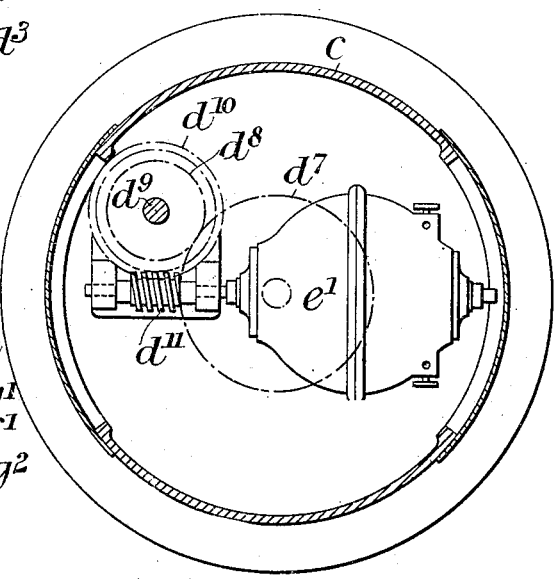
Figure 3A:
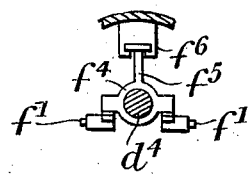
Figure 8:
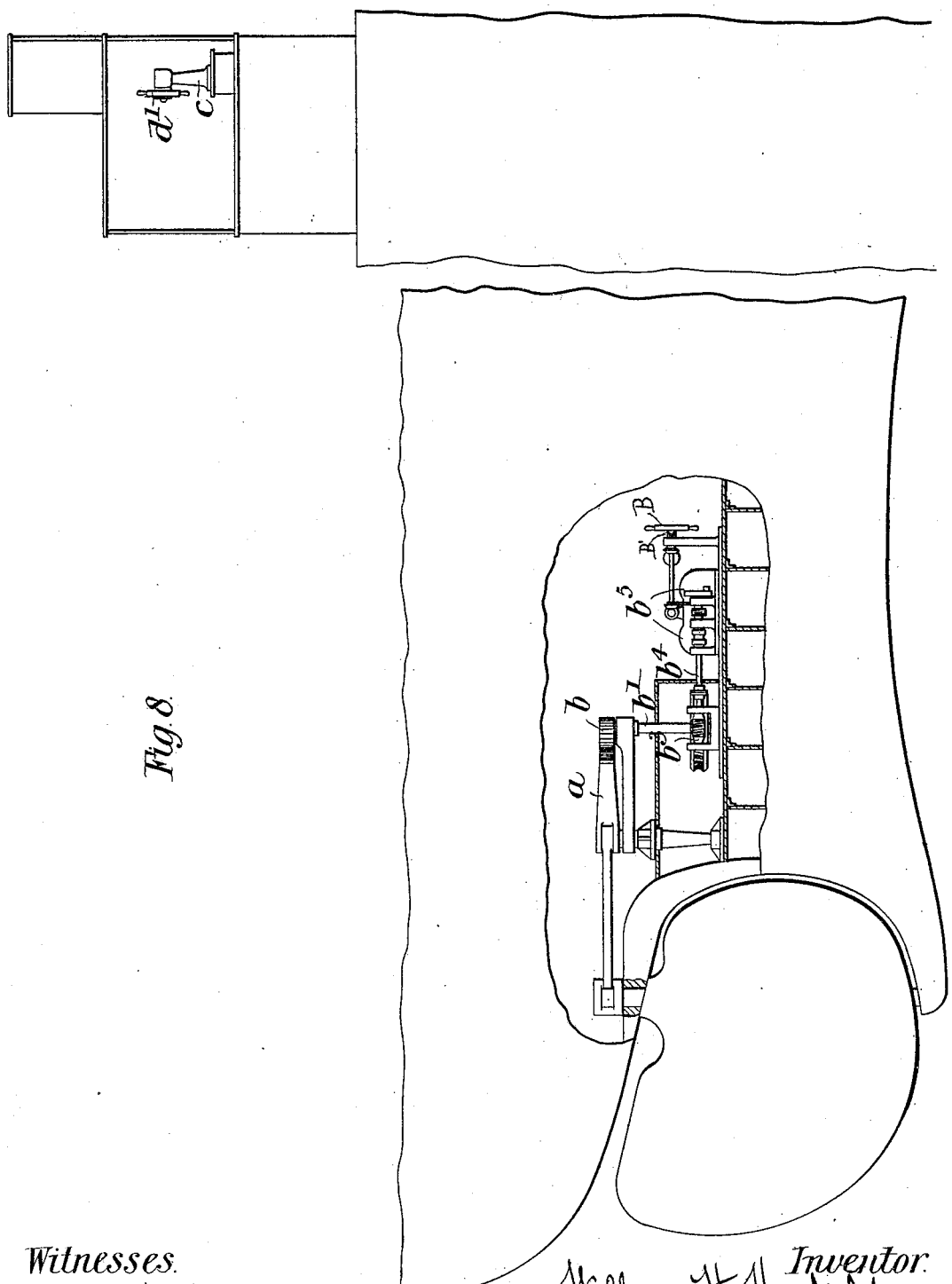
Figure 9:
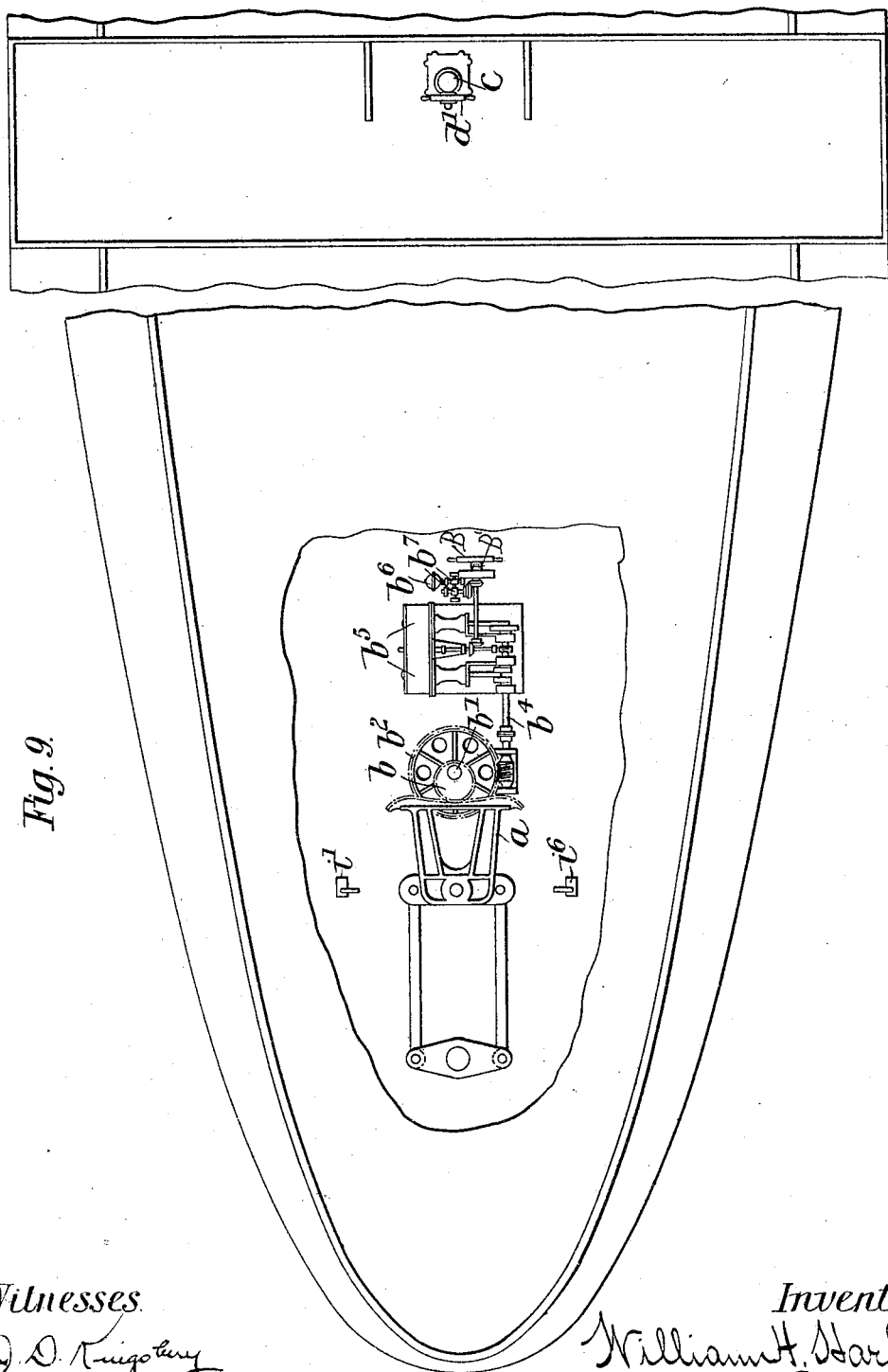

In the said drawings, Figure 1 is a plan view of the apparatus, the central portion showing the steering mechanism, the engine therefor, and the motor for controlling the engine-valve, the detached portion above the central portion showing the controlling device for said motor and the detached portions at the lower corners of the sheet indicating the circuit-breakers adapted to be operated by the steering-segment when the wheel is forced "hard" over. Fig. 2 is a vertical section of the steering-pedestal drawn to a larger scale. Fig. 3 is a horizontal section on the line 3 3, Fig. 2. Fig. $3^a$ is a view of a detail. Fig. 4 is a diagrammatic view illustrating the electrical connection of the various parts. Fig. 5 is a vertical section, similar to Fig. 2, of a modified construction of pedestal. Fig. 6 is a vertical section on the line 6 6, Fig. 5. Fig. 7 is a section on the line 7 7, Fig. 5. Fig. 8 is a side elevation, partly broken away, of portions of a vessel, showing my improved apparatus applied to the steering-gear of said vessel. Fig. 9 is a partial top plan view of said vessel, parts being broken away.

The steering-gear to which my electrical controlling apparatus is shown applied is of the kind described in my United States Patents Nos. 428,249 and 603,038.

$a$ is the toothed sector and $b$ the eccentric pinion gearing therewith, the said pinion being keyed upon a shaft $b'$, having a worm-wheel $b^2$, adapted to be driven by a worm $b^3$, fast upon the engine-shaft $b^4$, which is driven by the pistons in the cylinders $b^5 b^5$, to which the admission of steam is controlled by the electromotor $b^6$ and gear $b^7$ through the medium of my apparatus, as hereinafter more particularly described.

B represents an auxiliary steering-wheel which is loosely mounted on the shaft which controls the valve-gear of the engine-cylinders $b^5 b^5$ and is provided with a clutch B' for positively connecting said steering-wheel with the said shaft, so that the steering apparatus can be operated by means of this auxiliary steering-wheel B in case of accident to the electrical controlling apparatus.

The apparatus comprising the prime motor—to wit, the steam-engine and the immediate controlling device therefor herein shown—is identical with that shown and described in my British Patent No. 5,018, dated March 22, 1889, and as its particular construction forms no part of my present invention it is not described in detail. Other forms of prime motor and immediate control device might be substituted for the construction shown in the drawings.

The said controlling apparatus comprises a steering-pedestal adapted to be placed in any convenient position. This pedestal, Figs. 2 and 3, consists of the frame or standard $c$, in which is mounted the spindle $d$, carrying the steering-wheel $d'$ and a bevel-wheel $d^2$, gearing with a bevel-wheel $d^3$, mounted upon the squared upper end of a vertical spindle $d^4$, the lower end $d^5$ of which is formed with a quick screw-thread. The said screw-threaded end $d^5$ works in the internally-screw-threaded boss $d^6$ of a toothed wheel $d^7$, which is fixed in position in the frame $c$ and gears with a pinion $d^8$, keyed to the upper part of a spindle $d^9$, having at its lower end a worm-wheel $d^{10}$, gearing with a worm $d^{11}$. This worm $d^{11}$ is keyed upon the shaft $e$ of an electromotor $e'$, which is of any suitable description and is supplied with current from any suitable source through the wires $e^2$ $e^3$, Fig. 4, the said supply being controlled as hereinafter described. The spindle $d^4$ carries four spring-contacts $f f' f^2 f^3$, arranged in pairs $f f'$ and $f^2 f^3$, respectively, and adapted to be brought into contact with insulated contacts $g g' g^2$ and $g^3 g^4 g^5$, respectively, mounted in the frame $c$, by the rotation of the spindle $d^4$ through the medium of the bevel-wheels $d^2$ $d^3$, spindle $d$, and steering-wheel $d'$, the rotation of the said spindle $d^4$ causing it to run up or down in the screw-threaded boss $d^6$. The contacts $f f' f^2 f^3$ are fixed to a sleeve $f^4$, loose upon the spindle $d^4$, and having a foot $f^5$, which takes into a guide $f^6$, Fig. 3$^a$, upon the frame $c$ to prevent it rotating with the said spindle $d^4$. The contacts $g$ and $g^2$ are connected by the wire $h$ to one pole of the electromotor $e'$ and the contact $g'$ is connected to the other pole of the motor by the wire $h'$, (see the diagram Fig. 4,) so that when the spring-contacts $f f'$ are brought into contact with the contacts $g g'$ or $g' g^2$ current flows through the motor $e'$, which is thereby rotated. The contact $g^3$ is connected by the wire $i$, switch $i'$, and wires $i^2$ and $i^3$ to one pole of the electromotor $b^6$. The contact $g^4$ is connected by the wire $i^4$ to the other pole of the electromotor $b^6$, and the contact $g^5$ is connected by the wire $i^5$ to the switch $i^6$, which is connected up in the circuit between the wires $i^2$ and $i^3$. The switches $i'$ and $i^6$ are shown in Fig. 1 and are so arranged that their levers are operated by the tiller when the rudder is brought hard over in either direction, so as to break contact, and thereby interrupt the flow of the current and stop the engine.

The operation of the apparatus is as follows: The apparatus being at rest—that is to say, the contacts $f$ and $g$ being in the positions indicated in Figs. 2 and 4—so that no current is allowed to flow through the electromotor $e'$, the turning of the steering-wheel $d'$ in the usual manner will rotate the spindle $d$, which through the medium of the bevel-wheels $d^2$ $d^3$ turns the vertical spindle $d^4$. The rotary movement of this spindle $d^4$ causes it to move axially by reason of the engagement of the screw-threaded end $d^5$ in the boss $d^6$ of the wheel $d^7$, the axial movement being permitted as the squared upper end of the spindle can slide in the boss of the bevel-wheel $d^3$. For the sake of example, let it be assumed that the spindle $d^4$ is caused to move in a downward direction, so that the spring-contacts $f f'$ are brought, respectively, into contact with the insulated contacts $g' g^2$, whereby current is allowed to flow through the wire $e^2$ to the contact $f'$, contact $g^2$, wire $h$, through the electromotor, and thence back through the wire $h'$, contact $g'$, contact $f$ to the main conductor $e^3$. The electromotor $e'$ is thereby rotated, the revolution of its shaft $e$ rotating the toothed wheel $d^7$ through the medium of the worm $d^{11}$, worm-wheel $d^{10}$, spindle $d^9$, and pinion $d^8$. The rotation of the toothed wheel $d^7$ immediately returns the spindle $d^4$ into its normal position—that is to say, it breaks the contact between the spring and the insulated contacts $f f'$ and $g' g^2$, thus stopping the motor $e'$. By continuously turning the steering-wheel $d'$ the return movement of the spindle set up by the rotation of the motor is counteracted, so that the rudder is continuously actuated as long as the wheel is turned. At the moment the contacts $f f'$ have closed the circuit with the contacts $g' g^2$ the contacts $f^2$ $f^3$ have also made contact with the insulated contacts $g^4$ $g^5$, respectively, so that current flows from the wire $e^2$ to contact $f^3$, contact $g^5$, wire $i^5$, switch $i^6$, wire $i^3$ through the electromotor $b^6$, thence through the wire $i^4$ to the contact $g^4$ and back through the contact $f^2$ and wire $e^3$. The electromotor $b^6$ is thereby rotated and starts the engines $b^5$ through the medium of the gear $b^7$, which engines turn the rudder through the medium of the segment $a$ and pinion $b$ in the well-known manner. It will thus be seen that the rudder will be steadily and continuously actuated so long as the steering-wheel is moved in either direction.

Figs. 5, 6, and 7 illustrate a modified construction of steering-pedestal, the action of which, however, in electrically controlling the steering-gear is precisely similar to that above described. In this case the vertical spindle $d^4$ instead of carrying the spring-contacts and being arranged to receive an axial movement is provided at is lower end with a bevel-wheel $j$, which gears with a bevel-wheel $j'$, keyed upon a horizontal spindle $k$, mounted in supports $k' k'$ and carrying a worm $l$. This worm $l$ is in engagement with the worm-wheel $m$, mounted in the sliding bar $m'$ and gearing with an upper worm $n$, mounted upon a spindle $n'$, upon which is keyed a worm-wheel $n^2$, gearing with a worm $n^3$ upon a spindle $n^4$, carrying a worm-wheel $n^5$, which meshes with a worm $n^6$, keyed upon the shaft $e$ of the electromotor $e'$. The worm-wheel bar $m'$ carries the four spring-contacts $f f' f^2 f^3$, the said spring-contacts being adapted to move over the fixed insulated contacts $g g' g^2 g^3 g^4 g^5$, when the said worm-wheel is caused to move in the manner hereinafter described. With this arrangement when the steering-wheel $d'$ is turned the spindle $d^4$ is rotated and revolves the spindle $k$ through the medium of the bevel-wheels $j\,j'$. The rotation of the spindle $k$ turns the worm $l$, which thereby causes the worm-wheel $m$ to move longitudinally, since the said wheel is also in engagement with the worm $n$. This longitudinal movement of the worm-wheel $m$ brings the spring-contacts $f\,f'\,f^2\,f^3$ into contact with two pairs of the contacts $g\,g'\,g^2\,g^3\,g^4\,g^5$, which thereby supply current to the two motors in the manner described with reference to the preceding arrangement. When the motor $e'$ starts running, it turns the worm $n^2$ through the medium of the shaft $e$, worm $n^6$, worm-wheel $n^5$, spindle $n^4$, worm $n^3$, worm-wheel $n^2$, and spindle $n'$, so that the wheel $m$ is immediately returned, thereby interrupting the circuit, so as to stop the motor in the manner above described.

It will be obvious that by turning the steering-wheel in the opposite direction the current will be caused to flow in the opposite direction, thereby reversing the direction in which the rudder is turned. It will also be obvious that I may employ in connection with my system of electrically controlling steering apparatus two or more steering-pedestals in lieu of one, as above described and illustrated.

Having now particularly described and ascertained the nature of my said invention and in what manner the same is to be performed, I declare that what I claim is—

1. In a controlling device, the combination with an electric motor and a circuit therefor, circuit-controlling devices in said circuit, including stationary and movable contacts, an operating device for said movable contacts, a second electric motor in said circuit, and operative connections between said second motor and said movable contacts for restoring them to their normal positions, whereby the first-mentioned motor will be caused to operate whenever the operating device is moved and will cease to operate the instant the operating device is stopped, substantially as described.

2. In a controlling device, the combination with an electric motor, a circuit therefor and connections between said motor and the mechanism to be controlled, of circuit-controlling devices for said motor, including stationary contacts and movable contacts normally out of contact with said stationary contacts, a hand-operated device connected with said movable contacts for moving them into contact with said stationary contacts, a second electric motor in said circuit operative connections between said second motor and said movable contacts for restoring them to their normal positions, whereby the first-mentioned motor will be caused to operate when the hand-operated device is moved and will cease instantly to move when the hand-operated device is stopped, substantially as described.

3. The combination with a steering device, a prime motor for operating the same and a control device for said prime motor, of an electromotor operatively connected with said control device, a circuit-controller having a stationary and a movable part, contacts on said stationary part connected with the said electromotor, contacts on said movable part to engage said stationary contacts, circuit-breakers in the circuit of said electromotor having operating parts in the path of a part of the said steering device to cut out said electromotor when the latter reaches its limit of movement in either direction, a hand-operated device for moving the movable part of said circuit-controller, a second electromotor operatively connected with said movable part for restoring it to its normal position, and independent contacts on said stationary and movable parts of said circuit-controller for operating said second electromotor, substantially as described.

4. The combination with a prime motor, and a control device therefor, of an electromotor operatively connected with said control device, a circuit-controller provided with a stationary part and a longitudinally-movable, revoluble shaft, provided with a screw, contacts on said stationary part and said shaft for controlling said electromotor, a hand-operated device for rotating said shaft, a revoluble wheel mounted in stationary bearings and provided with a central threaded aperture engaging the screw on said shaft, a second electromotor for driving said wheel and independent contacts on said stationary part of the controller and on said shaft for controlling said second motor simultaneously with said first motor, substantially as described.

5. The combination with an electromotor, of a circuit-controller therefor having a stationary part provided with contacts connected with said motor, and a revoluble and longitudinally-movable shaft provided with a screw hand-operated mechanism for revolving said shaft, a wheel mounted in stationary bearings and provided with a threaded aperture engaging said screw, a second electromotor operatively connected with said wheel, contacts on the stationary part of the circuit-controller connected with said motor and independent contacts on said shaft for engaging the aforesaid stationary contacts for controlling both of said motors simultaneously, substantially as described.

WILLIAM HORATIO HARFIELD.

Witnesses:
G. I. REDFERN,
JOHN E. BOUSFIELD.